US010402398B2

(12) United States Patent
Vystrcil et al.

(10) Patent No.: US 10,402,398 B2
(45) Date of Patent: Sep. 3, 2019

(54) RECOMMENDATION SYSTEM WITH HIERARCHICAL MAPPING AND IMPERFECT MATCHING

(71) Applicant: Nuance Communications, Inc., Burlington, MA (US)

(72) Inventors: Jan Vystrcil, Prague (CZ); Martin Labský, Prague (CZ); Ladislav Kunc, Prague (CZ); Tomás Macek, Prague (CZ); Jan Kleindienst, Prague (CZ)

(73) Assignee: Nuance Communications, Inc., Burlington, MA (US)

( * ) Notice: Subject to any disclaimer, the term of this patent is extended or adjusted under 35 U.S.C. 154(b) by 233 days.

(21) Appl. No.: 15/104,477

(22) PCT Filed: Dec. 17, 2013

(86) PCT No.: PCT/US2013/075733
§ 371 (c)(1),
(2) Date: Jun. 14, 2016

(87) PCT Pub. No.: WO2015/094183
PCT Pub. Date: Jun. 25, 2015

(65) Prior Publication Data
US 2016/0364442 A1 Dec. 15, 2016

(51) Int. Cl.
*G06F 17/30* (2006.01)
*G06F 16/242* (2019.01)
(Continued)

(52) U.S. Cl.
CPC ........ *G06F 16/2425* (2019.01); *G06F 16/248* (2019.01); *G06F 16/9535* (2019.01)

(58) Field of Classification Search
None
See application file for complete search history.

(56) References Cited

U.S. PATENT DOCUMENTS 8,156,073 B1 * 4/2012 Dave ................ G06F 17/30528
707/602
8,271,484 B1 * 9/2012 Rajaraman ........ G06F 17/30477
705/26.81

(Continued)

OTHER PUBLICATIONS

Jun. 30, 2016—(WO) International Search Report/Written Opinion—App PCT/US2013/075733.

(Continued)

*Primary Examiner* — Debbie M Le
(74) *Attorney, Agent, or Firm* — Brian J. Colandreo; Michael T. Abramson; Holland & Knight LLP

(57) ABSTRACT

Aspects described herein provide solutions to problems posed by a user. Input that includes a specified subject may be received from a user. A specified descriptor for the specified subject may be obtained from a hierarchical taxonomy associated with the specified subject. An information repository may be searched based on the specific descriptor, and entries stored at the information repository that are associated with the specific descriptor may be indicated in a list of results. The specific descriptor may be iteratively generalized to obtain generalized descriptors, and the information repository may be searched based on the generalized descriptors. The generalized descriptors may also be specialized to obtain specialized descriptors, and the information repository may be searched based on the specialized descriptors. The list of results may include entries stored at the information repository that are respectively associated with the generalized descriptors and the specialized descriptors.

20 Claims, 9 Drawing Sheets

(51) Int. Cl.
*G06F 16/248* (2019.01)
*G06F 16/9535* (2019.01)

(56) References Cited

U.S. PATENT DOCUMENTS

| | | | | |
|---|---|---|---|---|
| 8,577,823 | B1* | 11/2013 | Gadir | H04L 29/08072 |
| | | | | 706/45 |
| 8,645,317 | B1* | 2/2014 | Klimetschek | G06F 17/3089 |
| | | | | 707/609 |
| 9,773,269 | B1* | 9/2017 | Lazarus | G06Q 30/0623 |
| 9,842,162 | B1* | 12/2017 | Hotchkies | G06F 17/3061 |
| 2007/0016556 | A1 | 1/2007 | Ann et al. | |
| 2008/0010250 | A1 | 1/2008 | Fontoura et al. | |
| 2009/0089270 | A1 | 4/2009 | Haley et al. | |
| 2009/0186631 | A1 | 7/2009 | Masarie, Jr. | |
| 2011/0087685 | A1* | 4/2011 | Lin | G06F 17/3087 |
| | | | | 707/765 |
| 2016/0335343 | A1* | 11/2016 | Luitjes | G06F 17/277 |

OTHER PUBLICATIONS

Sep. 23, 2014—International Search Report and Written Opinion—PCT/US20103/015733.

* cited by examiner

RECOMMENDATION SYSTEM WITH HIERARCHICAL MAPPING AND IMPERFECT MATCHING

CROSS-REFERENCE TO RELATED APPLICATIONS

This application is a U.S. National Stage application under 35 U.S.C. § 371 of International Application PCT/US2013/075733 (published as WO 2015/094183 A1), filed Dec. 17, 2013. Benefit of the filing date of this prior application is hereby claimed. The prior application is hereby incorporated by reference in its entirety.

BACKGROUND

There is an emerging class of advanced systems that on top of accepting concrete user commands can also accept a problem description and determine an appropriate action based on the context and further interaction with the user. Such problem-solving systems will need to handle many challenges to provide valuable results. One functional aspect such systems will need to address in order to provide valuable results is the actual mapping from the problem space to the action space. For example, in the place-of-interest (POI) domain, hierarchical taxonomies (or ontologies) of concepts may exist that arc useful when searching for relevant POIs. More generally, these information sources can be viewed as tools that can be utilized to propose possible solutions to problems expressed by a user. These taxonomies are often developed and run by large volunteer communities but may also be proprietary sources of information.

However, these sources of information might not exhaustively provide the information and relations to provide possible solutions to the broad types of questions posed by respective users. For more complex tasks, mappings from one hierarchical structure to another may be employed to obtain possible solutions to relatively more complex problems. Each of the hierarchical structures may describe different types of entities. Such data structures, however, may be maintained by different organizations and different editors, which may result in inconsistencies in the level of detail of the information. Common issues may include the incompatibility of such structures in terms of the names of identifiers used, the differing depths or granularities of classification of the information, and the extent to which a mapping covers the hierarchical structures.

Therefore, improvements to systems that provide possible solutions to problems posed by a user are needed.

SUMMARY

The following presents a simplified summary in order to provide a basic understanding of some aspects of the disclosure. The summary is not an extensive overview of the disclosure and is not intended to identify key or critical elements or to delineate the scope of protection sought. The following summary merely presents some concepts of the disclosure in a simplified form as an introduction to the more detailed description provided below.

A first aspect described herein provides a computer-implemented method of providing possible solutions to a problem posed by a user. Input that includes a specified subject may be received from a user. A specified descriptor for the specified subject may be obtained from a hierarchical taxonomy associated with the specified subject. An information repository may be searched based on the specific descriptor and one or more entries stored at the information repository that are associated with the specific descriptor may be indicated in a list of results. The specific descriptor may be iteratively generalized to obtain generalized descriptors, and the information repository may be searched based on the generalized descriptors. The generalized descriptors may also be specialized to obtain specialized descriptors, and the information repository may be searched based on the specialized descriptors. The list of results may include entries stored at the information repository that are respectively associated with the generalized descriptors or the specialized descriptors.

A second aspect described herein provides a system for providing possible solutions to a problem posed by a user. The system may include at least one processing unit and memory storing computer-readable instructions executable by the processing unit. When executed by the processing unit, the instructions may cause the system to provide an interface and a recommendation engine. The interface may be configured to receive input from a user, and the input may include a specified subject. The recommendation engine may be configured to obtain a specific descriptor for the specified subject from a hierarchical taxonomy associated with the specified subject. The recommendation engine may also be configured to iteratively generalize the specific descriptor to obtain generalized product descriptors and to iteratively specialize one or more of the generalized product descriptors to obtain at least one specialized descriptor. The recommendation engine may be configured to search the information repository based on the specific descriptor, the generalized descriptors, and the specialized descriptors to obtain a list of results. The list of results may include indications of entries stored at the information repository that are respectively associated with the specific descriptor, the generalized descriptors, and the specialized descriptors.

The details of these and other embodiments of the disclosure are set forth in the accompanying drawings and description below. Other features and advantages of aspects of the disclosure will be apparent from the description and drawings.

BRIEF DESCRIPTION OF THE DRAWINGS

The details of these and other embodiments of the disclosure are set forth in the accompanying drawings and description below. Other features and advantages of aspects of the disclosure will be apparent from the description and drawings.

DETAILED DESCRIPTION

Figure 1:
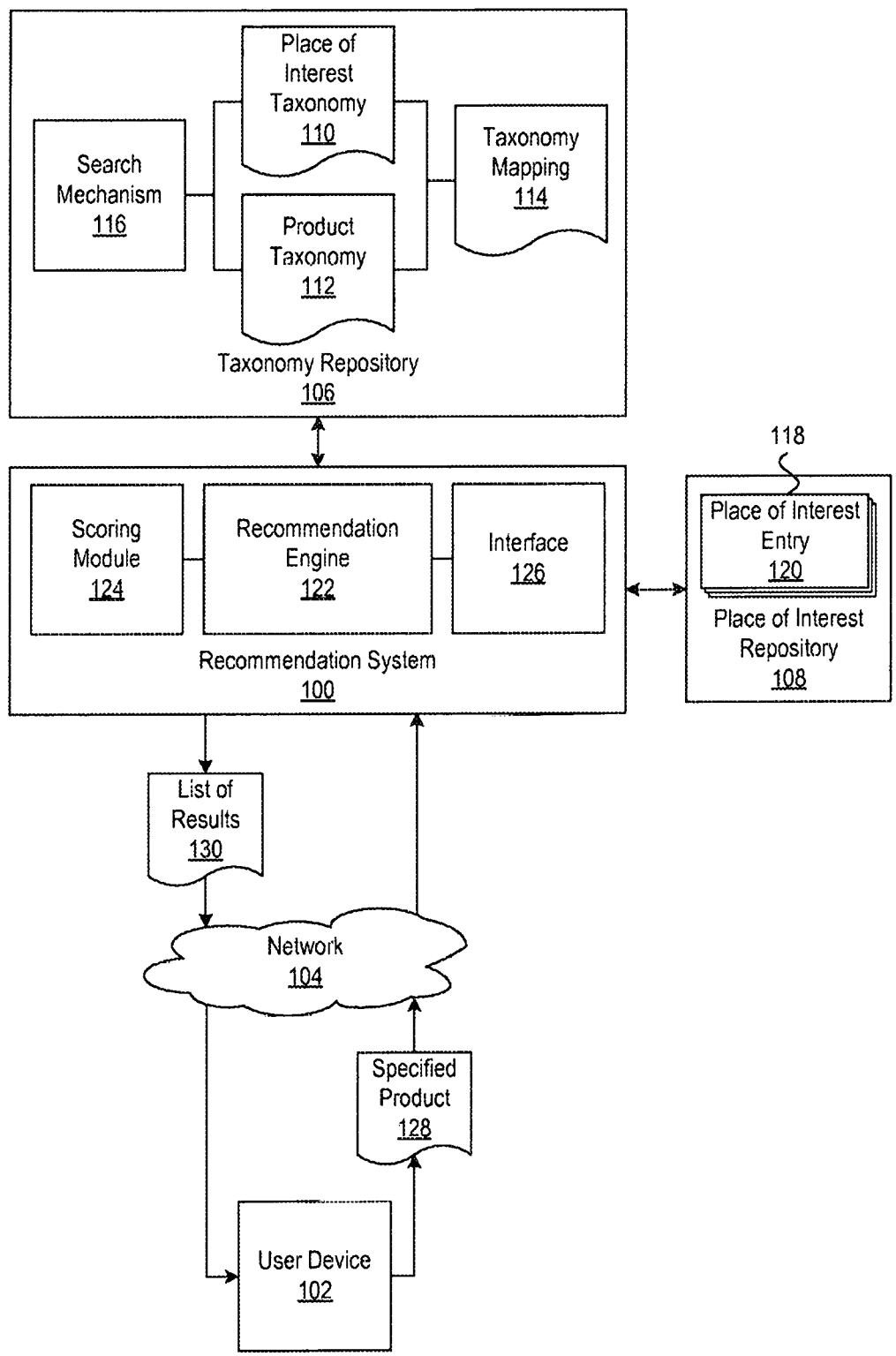
FIG. 1 is a block diagram of an example of an implementation of a recommendation system.

Aspects of the present disclosure are directed towards providing possible solutions to problems expressed by a user, e.g., problems expressed using plain language, voice recognition, and the like. The possible solutions are determined based on one or more repositories of taxonomically structured information. Through the use of taxonomically structured information, the approaches described herein advantageously provide alternative solutions to the problem expressed by the user where a specific solution might not be found.

While many implementations are possible, the approaches set forth in further detail below are described in the context of products and places of interest (POIs). In this context, the problem expressed by the user is the desire to identify a location at which the user may be able to obtain a particular product. Accordingly, an example of an expression of the problem in this context may be "I need a beefsteak tomato." The possible solutions to this problem may include a list of POIs where the user may be able to obtain the specified product, e.g., a supermarket, a deli, and other locations that may offer the product for sale. It will be appreciated that this context is but one example of the many contexts in which the approaches set forth below may be employed.

The approaches set forth below may also be employed in the context of user manuals. The topics of a user manual may be taxonomically structured from general topics to specific topics. A user manual, however, may refer to various topics using different terminology than the user. Accordingly, the approaches set forth below may be employed to direct the user to the appropriate sections of the user manual that discuss the topic specified by the user or alternative sections of the user manual that discuss similar topics. Consider, for example, a user that desires to locate the section of a user manual describing a vehicle stability control system. A vehicle stability control (VSC) system may also be referred to as an electronic stability control (ESC) system, a dynamic stability control (DSC) system, an electronic stability program (ESP), and by various proprietary trade names. The components of a vehicle may be structured taxonomically, e.g., "vehicle.driving_assistant_systems.vehicle stability". The vehicle taxonomy may include the various terms describing vehicle stability, e.g., . . . vehicle_stability. VSC_system, . . . vehicle_stability.ESC_system, and so forth. In this example, the user may be directed toward the section of the vehicle user manual that discusses the "ESC_system" even though the user specified the "VSC_system".

With the benefit of this disclosure, it will be appreciated that the approaches set forth below may be implemented in additional and alternative contexts with respect to additional and alternative information domains and taxonomies.

For clarity and consistency, the following terminology is adopted in the present application.

A taxonomy, as used herein, refers to a nested hierarchy of classifications. A taxonomy has one or more levels wherein each level indicates a classification and wherein the classification of a subsequent level is more specific relative to the classification of a previous level. The first level of a taxonomy includes the least specific classification, and the last level of a hierarchy includes the most specific classification. Each level of a taxonomy is related to one previous level and may be related to one or more subsequent levels. Accordingly, the classifications between the first level and the last level of a taxonomy are progressively more specific from the first level to the last level. A taxonomic descriptor ("descriptor") refers to one of the levels of the taxonomy along with any previous levels associated with that level.

Various approaches may be employed to implementing a taxonomic descriptor. The approach employed by way of example in this disclosure for the purposes of discussion concatenates the classifications of each level of a descriptor and inserts a delimiter between each level. The delimiter used in this example is the period character ("."). As an example, consider a taxonomy for purchasable goods ("products"). The descriptor for a "beefsteak tomato" may be "product.food.produce.tomato.beefsteak" using the example approach described above. In this example, "product" is the classification for the first level of the descriptor and thus the least specific classification while "beefsteak" is the classification for the last level and thus the most specific classification.

Taxonomies may be employed to describe various subjects and entities in this taxonomic fashion. A taxonomy for a product may thus be referred to as a product taxonomy. A taxonomy for a POI may thus be referred to as a POI taxonomy.

Levels may be added to or removed from the end of a descriptor. Removing a level from the end of a descriptor is referred to in this description as generalizing the descriptor. The descriptor is generalized because the most specific classification has been removed from the end of the descriptor. Accordingly, in this description, a generalized descriptor refers to the new descriptor that is obtained when the lowest level is removed from the end of a current descriptor. The new descriptor may be further generalized by removing another level from the end of the descriptor thereby obtaining another new and more general descriptor. Using the example above, the product descriptor for the "beefsteak tomato" may be generalized by removing the last level ("beefsteak") to obtain the generalized product descriptor of "product.food.produce.tomato". The generalized product descriptor, in this example, may be further generalized by again removing the last level ("tomato") from the end of the product descriptor to obtain the further generalized product descriptor of "product.food.produce".

Adding a level to the end of a descriptor is referred to in this description as specializing the descriptor. The descriptor is specialized because a more specific classification has been added to the end of the descriptor. Accordingly, in this description, a specialized descriptor refers to the new descriptor that is obtained when a new lowest level is added to the end of a current descriptor. The new descriptor may be further specialized by adding another level to the end of the descriptor thereby obtaining another and more specific descriptor. Continuing the example above, the product descriptor of "product.food.produce" may be specialized by adding the new level of "apple" to the end of the product descriptor to obtain the specialized descriptor of "product.food.produce.apple". The specialized product descriptor, in this example, may be further generalized by again adding a new level of "fuji" to the end of the product descriptor to obtain the more specific product descriptor of "product.food.produce.apple.fuji".

A specified product, as used herein, refers to a product specified by a user. Accordingly, a specific product descriptor, as used herein, refers to the product descriptor that most closely matches the specified product. As described in further detail below, the specific product descriptor may be generalized and specialized in order to identify a list of POIs that may offer the specified product or an alternative product similar to the specified product. An alternative product may be similar with the specified product when the alternative product and the specified product have at least one classification in common. For example, "gala apples" are an alternative product relative to "fuji apples" because the respective product descriptors, in this example, each include "product.food.produce.apple". More generally, a specified subject refers to a subject specified by a user, and a specific subject descriptor refers to the descriptor that most closely matches the specified subject.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging. Furthermore computer-readable media as used in this disclosure includes all non-transitory computer-readable media and excludes transitory computer readable media such as propagating signals.

Referring now to FIG. 1, a block diagram of an example of an implementation of a recommendation system 100 is shown. The recommendation system 100 may be in signal communication with a user device 102 via a network 104. The recommendation system 100 may also be in signal communication with a taxonomy repository 106 and a POI repository 108.

The taxonomy repository 106 may be a repository of taxonomic information regarding one or more taxonomies. The taxonomy repository 106, in this example, includes a POI taxonomy 110, a product taxonomy 112, a taxonomy mapping 114, and a search mechanism 116.

The POI taxonomy 110 defines a nested hierarchy of places of interest, and the product taxonomy 112 defines a nested hierarchy of products as described above. Examples of POI taxonomies may be available from various social networking services, royalty-free services, or subscription services known to those skilled in the art. Such services may provide access to collections of POIs and the POI taxonomies respectively corresponding to the POI collections. Examples of product taxonomies may be available from various knowledge bases known to those skilled in the art, e.g., Freebase provided by Metaweb Technologies, Inc. of San Francisco, Calif.

The taxonomy mapping 114 maps (establishes a relationship between) descriptors. The taxonomy mapping 114 may establish a relationship between descriptors from the same taxonomy or from different taxonomies. The taxonomy mapping 114 may establish a one-to-one relationship (1:1) between two descriptors, a one-to-many relationship between a descriptor and multiple descriptors (1:m), or a many-to-many relationship between descriptors (m:n). The taxonomy mapping 114, in this example, maps one or more product descriptors of the product taxonomy 112 to one or more POI descriptors of the POI taxonomy 110. The relationship between products and POIs may be a many-to-many relationship as a particular product may be provided by many types of POIs and a POI may provide many types of products. The taxonomy mapping 114, in this example, may thus be utilized to determine a type of POI that provides a particular type of product. With this understanding, it will be appreciated that a taxonomy mapping may also be described as mapping elements of a source taxonomy to elements of a target taxonomy. Product taxonomies, POI taxonomies, and taxonomy mappings will be discussed further below with reference to FIG. 2.

The search mechanism 116 may search the taxonomies of the taxonomy repository 106 for descriptors that most closely match a search term. In response to receipt of a search term, the search mechanism 116 may search the taxonomies and provide a descriptor that most closely matches the search term. As an example, if the search term is "beefsteak tomato," the search mechanism 116 may locate a matching descriptor in the product taxonomy 112—e.g., "product.food.produce.tomato.beefsteak"—and provide the descriptor as a search result. As described in further detail below, the recommendation engine 122 of the recommendation system 100 may provide search terms to the search mechanism 116 in order to obtain respective descriptors from the taxonomies that match the search terms.

The POI repository 108 is a repository of POI information. Accordingly, the POI repository 108 may be a data store that implements a POI schema and stores a set 118 of POI entries 120 in accordance with the POI schema. A POI entry 120 may include the name of the POI, a geographic location of the POI, a category for the POI. The POI entry 120 may indicate the category of the POI using a POI descriptor, e.g., "poi.shop.grocery". The POI entry 120 may indicate the geographic location of the POI using, e.g., coordinates of latitude and longitude. The descriptor of the POI entry 120 may be relatively general (e.g., "poi.shop") or relatively specific ("poi.shop.grocery.deli"). POI repositories may also be available from various social networking services, royalty-free services, subscription services, and other services known to those skilled in the art that provide access to collections of POIs and corresponding POI information. POI repositories will be discussed in further detail below with reference to FIG. 2.

The recommendation system 100, in this example, includes a recommendation engine 122, a scoring module 124, and an interface 126. The interface 126 may be a user interface through which a user interacts with the recommendation system 100 using the user device 102. The user may access the interface 126 of the recommendation system 100 in order to submit input that includes a specified subject. In this example, the specified subject is a specified product 128 the user desires to purchase. As noted above, however, the specified subject may be a specified service the user desires to use (e.g., "I need to withdraw cash."), a specified topic the user desires to lookup in a user manual (e.g., "I need to know more about vehicle stability control systems."), and so forth. In response to receipt of the specified subject, the recommendation system 100 may provide a list of results 130 through the interface 126.

The list of results 130 may include results that are relevant to the specified subject received from the user. A result may be relevant where the result is associated with a specific descriptor for the specified subject. For example, the descriptor of "vehicle.driving_assistant_systems.vehicle_stability.VSC_system" may be a specific descriptor for the specified subject of "vehicle stability control system." If a vehicle user manual includes a section associated with this specific descriptor, then that section may be a relevant result for the specified subject in this example. A result that is associated with the specific descriptor for a specified subject is referred to in this description as a perfect match.

A result may also be relevant where the result is associated with a generalized or specialized descriptor. A result that is associated with a generalized or specialized descriptor for a specified subject is referred to in this description as an imperfect match. Continuing the example above, if a vehicle user manual includes a section associated with the generalized descriptor of "vehicle.driving_assistant_systems.vehicle_stability", then that section may be an imperfect match but nonetheless a relevant result for the specified subject of "vehicle stability control system" in this example. In addition, if the vehicle user manual includes a section associated with the specialized descriptor of "vehicle.driving_assistant_systems.vehicle_stability.ESC_system", then that section may also be an imperfect match but again nonetheless a relevant result for the specified subject of "vehicle stability control system."

Furthermore, a result may be relevant where the result is associated with a descriptor through the taxonomy mapping 114. As noted above, the taxonomy mapping 114 may map a first descriptor of a first taxonomy to a second descriptor of a second taxonomy. If a result is associated with the first descriptor of the first taxonomy, then the result may also be described as associated with the second descriptor of the second taxonomy mapped to the first descriptor through the taxonomy mapping 114. In this way, the recommendation system 100 may determine, e.g., which types of POIs provide which types of products based on the taxonomy mapping 114 between the POI taxonomy 110 and the product taxonomy 112.

The list of results 130 may include multiple results and may include both results corresponding to perfect matches and results corresponding to imperfect matches. The recommendation system 100 may provide the list of results 130 to the user device 102 via the interface 126. In the context of products purchasable at POIs, the list of results 130 may be a list of POIs at which a specified product is available or of POIs at which alternative but similar products are available. In the context of user manuals, the list of results may be a list of sections of the user manual that discuss a specified subject or of sections of the user manual that discuss alternative but similar subjects. Additional or alternative types of results for additional or alternative contexts will be appreciated with the benefit of this disclosure. The list of results 130 will be discussed in further detail below with reference to FIG. 6.

The recommendation engine 122 is responsible for generating the list of results 130 in response to receipt of a specified subject. In operation, the recommendation engine 122 may receive from the interface 126 the input provided to the user interface by the user device 102. As noted, the input may include the specified subject, e.g., a specified product 128. In the context of products and POIs, the list of results 130 may be a list of POIs at which the product or an alternative but similar product is available. The input may also include location information indicating the current geographic location of the user. The location information may be, e.g., latitude and longitude coordinates obtained from a Global Positioning System (GPS) unit of the user device 102.

In order to generate the list of results 130, the recommendation engine 122 may obtain a search term based on the input received from the user device 102. For example, the recommendation engine 122 may extract the specified product 128 from the input, and use the specified product as a search term for the search mechanism 116 of the taxonomy repository 106. Upon receipt of the specified product 128 from the recommendation engine 122, the search mechanism 116 may initiate a search of the taxonomies of the taxonomy repository 106 for a descriptor that most closely matches the specified product. The search mechanism 116 may provide the descriptor that most closely matches the specified product 128 (e.g., the specific product descriptor) to the recommendation engine 122 as a search result.

In some example implementations, the recommendation engine 122 may then utilize the descriptor received from the search mechanism 116 of the taxonomy repository to search another repository for entries associated with the descriptor. In the context of vehicle user manuals, the descriptor may be a descriptor for a VCS system. The recommendation engine 122, in this context, may then search a vehicle user manual for sections associated with the descriptor and identify any sections associated with that descriptor as a relevant result. The recommendation engine 122 may include relevant results in the list of results 130 provided back to the user.

In some example implementations, the recommendation engine 122 may also utilize the descriptor to identify mappings between the descriptor for the specified subject and other descriptors. The recommendation engine 122 may query the taxonomy mapping 114 of the taxonomy repository 106 for any mappings of the specific descriptor to related descriptors. The recommendation engine 122 may then utilize the related descriptors to search repositories for entries associated with the related descriptors. As an example, the recommendation engine 122 may provide the search mechanism 116 a search term based on the specified product 128, and the recommendation engine 122 may receive a specific product descriptor for the specified product in response. The taxonomy mapping 114, in this example, may establish relationships between product descriptors and POI descriptors. The recommendation engine 122 may query the taxonomy mapping 114 for any POI descriptors associated with the specific product descriptor and receive one or more POI descriptors in response. The mapping between the specific product descriptor and the POI descriptor may indicate that the specified product may be available of the type of POI described by the POI descriptor. The recommendation engine 122 may then query the POI repository 108 for any POI entries 120 that are respectively associated with one or more of the POI descriptors mapped to the specific product descriptor. The recommendation engine 122 may identify a POI entry 120 that is associated with one of the POI descriptors mapped to the specific product descriptor as a relevant result and include the POI entry in the list of results 130 provided to the user.

The recommendation engine 122 may also generalize or specialize the descriptor for a specified product to obtain generalized descriptors or specialized descriptors. The recommendation engine 122 may generalize a descriptor by removing the last level having the most specific classification from the descriptor as described above. The recommendation engine 122 may specialize a descriptor by adding a new level having a more specific classification to the descriptor as also described above. The recommendation engine 122 may search repositories for entries associated with a generalized descriptor or a specialized descriptor and identify entries associated with the generalized descriptor or the specialized descriptor as relevant results to include in the list of results 130. The recommendation engine 122 may also query the taxonomy mapping 114 for any related descriptors mapped to the generalized descriptor or the specialized descriptor. The recommendation engine 122 may thus search repositories for entries associated with the related descriptors mapped to the generalized descriptor or the specialized descriptor. In this way, the recommendation engine 122 may identify relevant results associated with subjects alternative but similar to the specified subject received from the user.

As an example, the user may specify "beefsteak tomatoes" as the specified product 128, and the recommendation engine may receive "product.food.produce.tomato.beefsteak" as the specific product descriptor from the taxonomy repository 106. The recommendation engine 122 may query the taxonomy mapping for a POI descriptor related to the specific product descriptor. If the recommendation engine 122 cannot identify a related POI descriptor in the taxonomy mapping, the recommendation engine 122 may iteratively generalize the specific product descriptor to obtain the generalized product descriptor of "product.food.produce" and determine that the taxonomy mapping 114 maps this generalized product descriptor to the related POI descriptor of "poi.shop.grocery". The recommendation engine 122 may then search the POI repository 108 for a POI entry 120 associated with the product descriptor. The POI repository 108 may include a POI entry 120 for a supermarket, and the entry may be associated with the related POI descriptor. The recommendation engine 122 may thus include the POI entry 120 for the supermarket in the list of results 130 provided to the user. Because tomatoes are likely to be available from supermarkets, the POI entry 120 for the supermarket in the list of results 130 may be a useful result to the user. Additional examples will be appreciated with the benefit of this disclosure.

The recommendation engine may additionally generalize or specialize the related descriptors mapped to the descriptor for the specified subject. The recommendation engine 122 may thus search repositories for entries associated with the generalized related descriptors or the specialized related descriptors. In this way, the recommendation engine 122 may likewise identify relevant results associated with alternative but similar related descriptors.

Continuing the example above, the recommendation engine 122 may obtain the POI descriptor of "poi.shop.grocery" based on a mapping between this POI descriptor and a generalized product descriptor of "product.food.produce". The recommendation engine may specialize the generalized POI descriptor to obtain a specialized POI descriptor of "poi.shop.grocery.deli". The recommendation engine 122 may then search the POI repository 108 for a POI entry 120 associated with this specialized POI descriptor. The POI repository 108 may include a POI entry 120 for a deli, and the entry may be associated with the specialized POI descriptor. The recommendation engine 122 may thus include the POI entry 120 for the deli in the list of results 130 provided to the user. Because tomatoes may be available from a deli, the POI entry 120 for the deli in the list of results 130 may be a useful result to the user. Additional examples will be appreciated with the benefit of this disclosure.

It will be appreciated that a repository might not include a result associated with a specific descriptor for a specified subject, a generalized descriptor, or a specialized descriptor. Stated differently, the result set received from a repository in response to a query based on a descriptor may be empty. Accordingly, the recommendation engine 122 may iteratively generalize and specialize a descriptor in order to obtain a non-empty result set from the repository. In this way, the recommendation engine 122 may locate results for alternative descriptors above, below, or on the same level as a descriptor. Although the list of results 130 might not perfectly match the specified subject received from the user, the list of results may advantageously include results the user nonetheless finds useful.

The recommendation engine 122 may also provide the list of results 130 to the scoring module 124 to be scored and ordered. Once the scoring module 124 scores and orders the list of results 130, the recommendation engine 122 may provide the list of results to the interface 126, and the interface 126 may provide the list of results to the user device 102 associated with the user.

The scoring module 124, in operation, scores the list of results 130 and orders the list of results based on the respective scores. A score for a result in the list of results 130 is referred to in this description as a result score, s. A result score, s, may be based on a number of factors. One factor that may affect a result score, s, is the relevancy of the result. The factor for the relevancy of the result is referred to in this description as the relevancy factor, r. The relevancy factor, r, may correspond to the number of times a descriptor was generalized or specialized in order to identify a repository entry associated with the generalized or specialized descriptor (e.g., obtain a non-empty result set from a repository). Where a related descriptor mapped to the descriptor is used to search a repository, the relevancy factor, r, may additionally or alternatively correspond to the number of times the related factor was generalized or specialized in order to identify a repository entry associated with the generalized or specialized related descriptor. For example, the relevancy factor, r, may correspond to the sum of the number of times a descriptor and a related descriptor were generalized or specialized in order to identify an associated repository entry. In some example implementations, the relevancy factor, r, may be used as the result score, s, e.g., s=r. Additionally, the relevancy factor, r, may be a value that is relatively higher for a result that is relatively more relevant and that is relatively lower for a result that is relatively less relevant.

In other example implementations, the result score, s, may be a combination of the relevancy factor, r, with other factors. In the context of POIs, for example, another factor that may affect the result score, s, is a distance (e.g., the air distance or road distance), d, between the current geographic location of the user and the geographic location of the POI. In this context, the result score, s, may be obtained by multiplying the relevancy score, r, by the distance, d, e.g., s=d×r. In case where input methods such as automatic recognition of speech or handwriting are used, a confidence score, c, of an underlying recognition engine also may be used when computing the result score s. Multiple results from recognition engines may then be sorted e.g., according to the following formula: s=d×r×(1÷c). Additional and alternative factors associated with additional and alternative contexts will be appreciated with the benefit of this disclosure.

The scoring module 124 may obtain result scores for each of the results in the list of results 130. The scoring module 124 may then compare the result scores to order the results based on the result scores, e.g., from highest result score to lowest result score. Accordingly, after ordering the list of results 130, in some example implementations, the results that are relatively more relevant and geographically closer results may be near the top of the list while the relatively less relevant and geographically farther results may be near the bottom of the list.

The user device 102 is an electronic device capable of exchanging electronic communications with the recommendation system 100. The user device 102 may be, for example, a computing device such as, e.g., a desktop computer, a laptop computer, a tablet computer, a palmtop computer, a smartphone, a smart television, a fixed or portable in-car navigation device, a fixed or portable in-car infotainment device, and other types of computing devices. As seen in FIG. 1, the computing device 102, in this example, is in signal communication with the recommendation system via a network 104. The network 104 is a communications network. The network 104 may include one or more wired networks, wireless networks, or combinations of wired and wireless networks. Accordingly, the network 104 may include a local area network (LAN), a wide area network (WAN) such as the Internet, a cellular network, a public switched telephone network (PSTN), and other types of networks known to those skilled in the art.

It will be appreciated that the implementation illustrated in FIG. 1 is by way of example only. In some example implementations, the user device 102 may be in direct communication with the recommendation system 100 rather than through a network 104. In some example implementations, the recommendation system 100 may be in signal communication with the taxonomy repository 106 and the POI repository 108 via a network similar to the network 104. In some example implementations, the recommendation system 100 may reside at or be a component of the user device 102.

Figure 2:
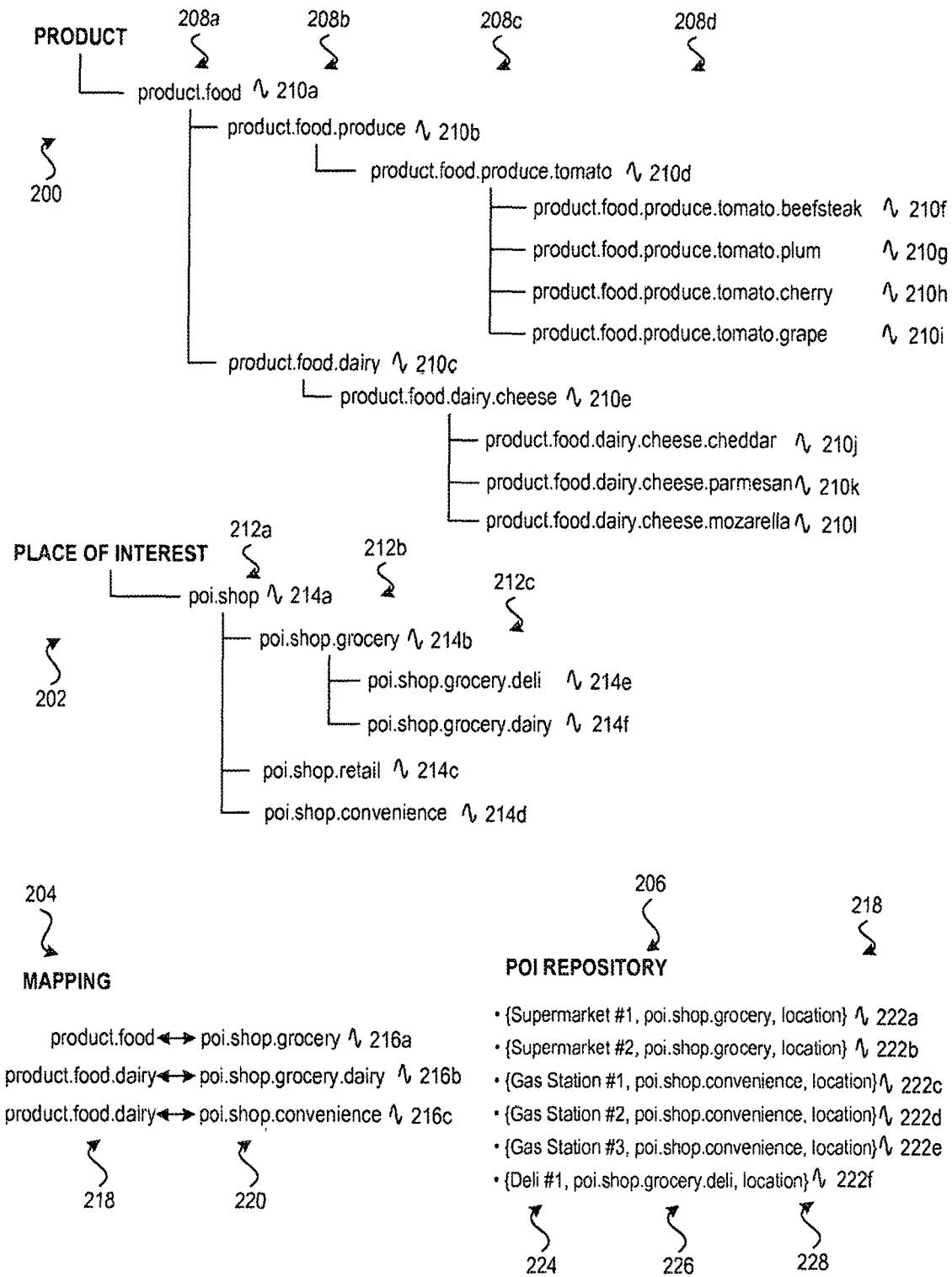
FIG. 2 is an illustration of a portion of example taxonomies, an example taxonomy mapping, and example entries of a repository.

In FIG. 2, an illustration of a portion of example taxonomies, an example taxonomy mapping, and example entries of a repository are shown. In particular, FIG. 2 illustrates a portion of a product taxonomy 200, a portion of a POI taxonomy 202, a taxonomy mapping 204 between the product taxonomy and the POI taxonomy, and example entries 206 of a POI repository.

As described above, the product taxonomy 200 includes multiple nested levels 208a-d of product classifications where the classifications of higher levels of the product taxonomy are less specific relative to lower levels of the product taxonomy. As also described above, the classifications of each level 208a-d may be used to construct a respective descriptor 210a-l for product types. As seen in FIG. 2, the descriptors 210a-l are each a concatenated string of the product classification at that level back to the highest level 208a. Similarly, the POI taxonomy 202 also include multiple nested levels 212a-c of POI classifications that are relatively less specific at higher levels and relatively more specific at lower levels. The classifications of each level 212a-c of the POI taxonomy 202 are likewise used to construct respective descriptors 214a-d for POI types, which are also each a concatenated string of the POI classification at that level back to the highest level 212a.

The taxonomy mapping 204, in this example, is a mapping between the product taxonomy 200 and the POI taxonomy 202. Accordingly, taxonomy mapping 204 includes multiple relationships 216a-c between descriptors 218 of the product and descriptors 220 of the POI. The taxonomy mapping 204, in this example, may thus indicate types of POIs at which various products may be available. For example, the taxonomy mapping 204 indicates that dairy products may be available at a deli by establishing a relationship 216b between the product descriptor of "product.food.dairy" and "poi.shop.grocery.deli" as shown by way of example in FIG. 2.

The POI repository 206 may include POI entries 222a-f (collectively 222) as described above. The POI entries 222a-f may include, e.g., the name 224 of the POI, a category 226 for the POI, and a location 228 for the POI. As seen in FIG. 2 and as noted above, the category 226 in a POI entry may be a POI descriptor. As also noted above, the location 228 of a POI entry may be latitude and longitude coordinates indicating the geographic location of the POI.

It will thus be appreciated that a recommendation engine may query the taxonomy mapping 204 with a product descriptor 218 (e.g. "product.food"), identify a POI descriptor 220 mapped to that product descriptor (e.g., "poi.shop.grocery"), and then search the POI repository 206 for any POI entries 222 having a category 226 that matches the POI descriptor. The recommendation engine may thus include the POI entries 222 having a category 226 that matches the POI descriptor 220 in the list of results provided back to the user. The recommendation engine may also utilize the respective locations 228 of those POI entries 222 to determine the distance between the POIs and the present location of the user.

FIGS. 3-6 illustrate example method steps for using a recommendation system to obtain a list of search results based on a specified subject received from a user. The flowcharts below are described in the context of products and POIs at which those products might be available. It will be appreciated, however, that various steps of the flowcharts described below may be employed to obtain a list of search results for a specified subject in other contexts as well.

Figure 3:
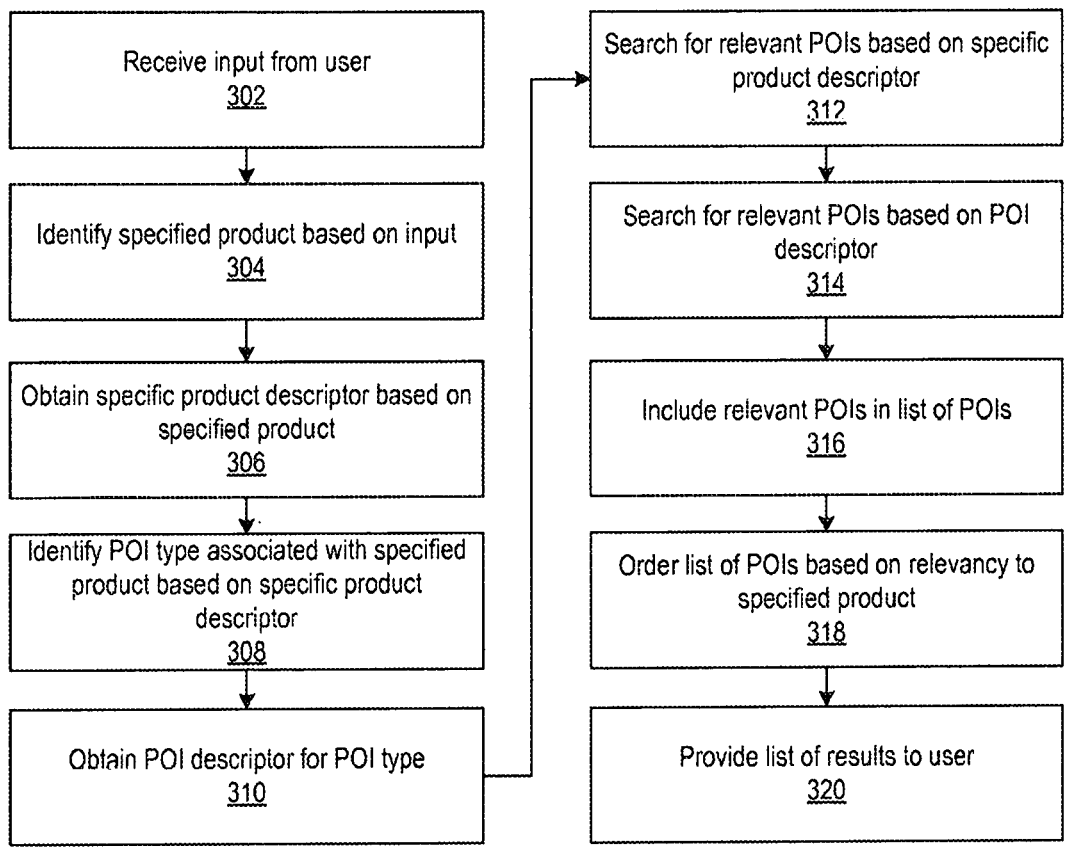
FIG. 3 is a flowchart of example method steps for recommending a list of POIs associated with a product specified by a user.

In FIG. 3, a flowchart 300 of example method steps for recommending a list of POIs associated with a product specified by a user is shown. Input may be received from a user (block 302), e.g., from a user device associated with the user. The input may include a specified subject, e.g., a specified product the user is interested in purchasing. The input may also include location information indicating the current geographic location of the user. A recommendation engine may receive the input and identify the specified product or products included in the input (block 304), e.g., by extracting a text string from the input where the text string corresponds to the specified product. The recommendation engine may then obtain a specific product descriptor for the specified product (block 306), e.g., by querying a product taxonomy with the specified product extracted from the input. In some embodiments, multiple uncertain hypotheses about the user input may be generated, e.g., when using automatic recognition of speech or handwriting. When multiple product references are identified in the user input, the subsequent steps of the search algorithm may be carried out for all identified product references that satisfy a configurable certainty threshold. Finally, the retrieved POIs may be weighted and sorted also taking into account the confidence scores of the most probable input hypothesis that led to retrieving the POI.

The recommendation engine may then identify a type of POI associated with the specified product based on the specific product descriptor for the specified product (block 308). To identify a type of POI associated with the specified product, the recommendation engine may locate the specific product descriptor in a taxonomy mapping that maps products to POIs and POIs to products by establishing relationship between product descriptors and POI descriptors as described above. Through the taxonomy mapping, the recommendation engine may thus obtain a POI descriptor for a POI type associated with the specified product. It will be appreciated that, in some circumstances, a taxonomy mapping might not include a mapping between the specific product descriptor and a POI descriptor. Accordingly, the recommendation engine may generalize or specialize the specific product descriptor in order to locate a POI descriptor related to the generalized or specialized product descriptor. Identifying a POI type associated with a specified product is discussed further below with reference to FIG. 4.

Having obtained the specific product descriptor for the specified product and the POT descriptor for a POI type associated with the specified product, the recommendation engine may search for relevant POIs based on the specific product descriptor (block 312) (e.g. by searching for current promotions of products sold by specific shops) and search for relevant POIs based on the POI descriptor (block 314). As described in further detail below with reference to FIG. 5, the recommendation engine may generalize and specialize the specific product descriptor when searching for relevant POIs based on the specific product descriptor. Additionally, the recommendation engine may generalize and specialize the POI descriptor when searching for relevant POIs based on the POI descriptor as described in further detail below with reference to FIG. 6.

When the recommendation engine locates relevant POIs, the recommendation engine may include the relevant POIs in the list of results (block 316) as described above. Relevant POIs may include POIs associated with the specific product descriptor, a generalized product descriptor based on the specific product descriptor, or a specialized product descriptor based on the specific product descriptor. Having obtained the list of results, the recommendation engine may provide the list of results to the scoring module for scoring and ordering (block 318). As described above, the scoring and ordering of the results may be based on the relevancy of the results to the specified product.

Finally, the recommendation system may provide the list of results to the user (block 320), e.g., at a user device associated with the user such as an in-car navigation device. The list of results may include one or more POIs that are relevant to the specified product. The list of results may include respective POI information for the POIs included in the list. The POI information may include, e.g., the name of the POI as well as the geographic location of the POI. The user device may utilize the geographic location of the POI to, e.g., determine the distance between the POI and the present location of the user as well as provide navigation directions to the POI from the present location of the user.

Figure 4:
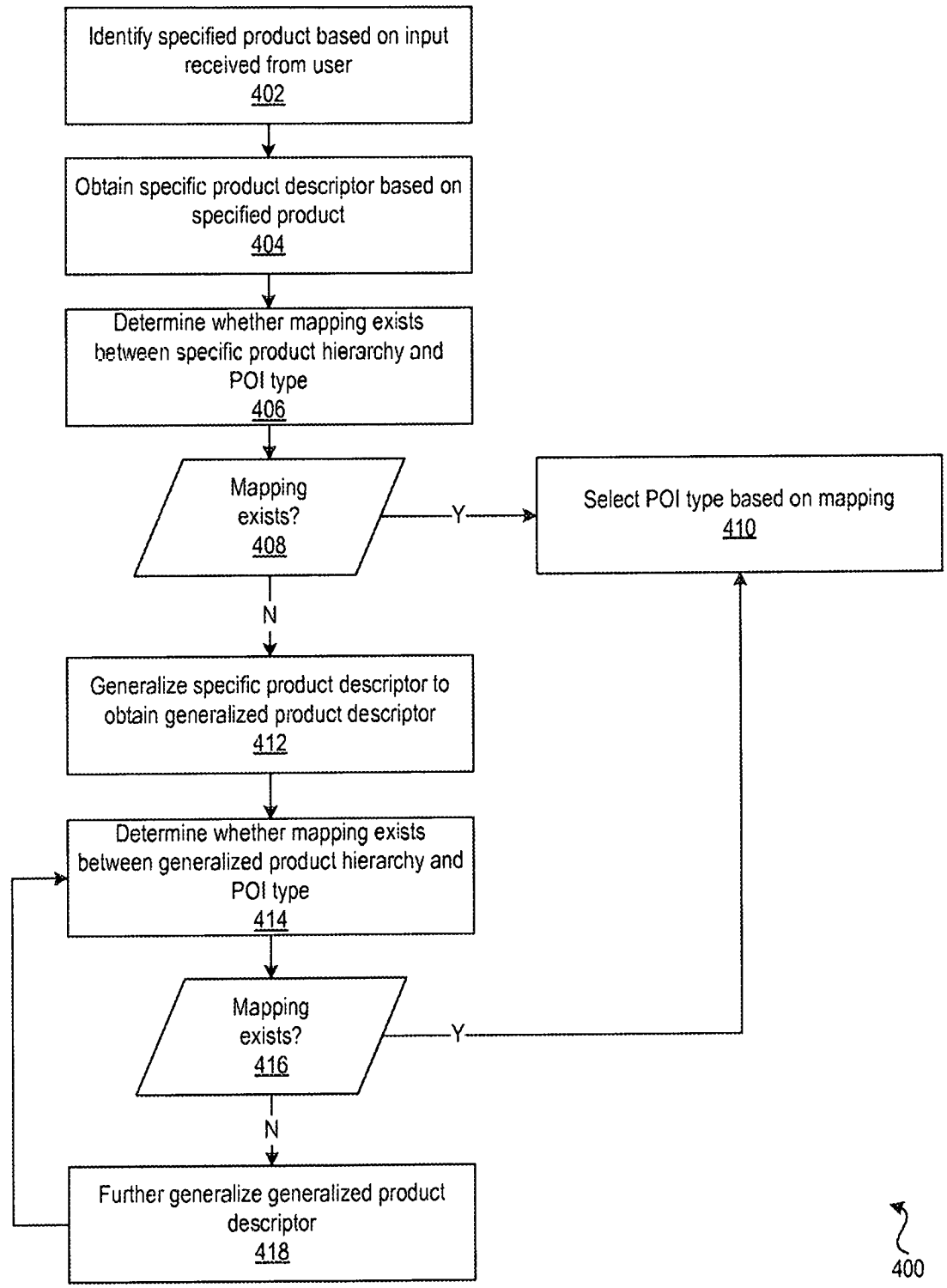
FIG. 4 is a flowchart of example method steps for determining a POI type associated with a product specified by a user.

Referring now to FIG. 4, a flowchart 400 of example method steps for determining a POI type associated with a product specified by a user is shown. The recommendation engine may identify a specified product based on input received from the user (block 402) and obtain a specific product descriptor for the specified product (block 404) as described above. The recommendation engine may then query a taxonomy mapping to determine whether a mapping exists between the specific product descriptor and a related POI descriptor (block 406). If the taxonomy mapping includes a mapping between the specific product descriptor and a POI descriptor (block 408:Y), then the recommendation engine may select the related POI descriptor as the POI type associated with the specified product (block 410).

If, however, the taxonomy mapping does not include a mapping between the specific product descriptor (block 408:N), then the recommendation engine may generalize the specific product descriptor to obtain a generalized product descriptor (block 412). The recommendation engine may again query the taxonomy mapping to determine whether a mapping exists between the generalized product descriptor and a related POI descriptor (block 414). If the taxonomy mapping includes a mapping between the generalized product descriptor and a POI descriptor (block 416:Y), then the recommendation engine may select the related POI descriptor as the POI type associated with the specified product (block 410).

If the taxonomy mapping does not include a mapping between the generalized product descriptor and a POI descriptor (block 416:N), then the recommendation engine may further generalize the product descriptor (block 418) and repeat steps 414-418 until the recommendation engine identifies a POI descriptor mapped to the generalized product descriptor.

The example product taxonomy 200, POI taxonomy 202, and taxonomy mapping 204 of FIG. 2 may illustrate the example steps set forth above. In this example, a user may specify the product of "beefsteak tomatoes," and the recommendation engine may identify the product descriptor 210*f* in the product taxonomy 200 as the best product descriptor for the specified product. The recommendation engine may determine that the taxonomy mapping 204 does not include a mapping between the product descriptor 210*f* and a related POI descriptor. As a result, the recommendation engine may iteratively generalize the product descriptor 210*f* to obtain, e.g., product descriptors 210*d*, 210*b*, and 210*a*. The recommendation engine, in this example, may determine that the taxonomy mapping 204 does not include mappings for product descriptors 210*d* and 210*b* but does include a mapping 216*a* for the product descriptor 210*a*. In this example, the mapping 216*a* may map the product descriptor 210*a* ("product.food") to the POI descriptor 214*b* ("poi.shop.grocery"). The recommendation engine may thus select POI descriptor 214*b* as the POI type associated with the specified product of "beefsteak tomatoes."

Figure 5:
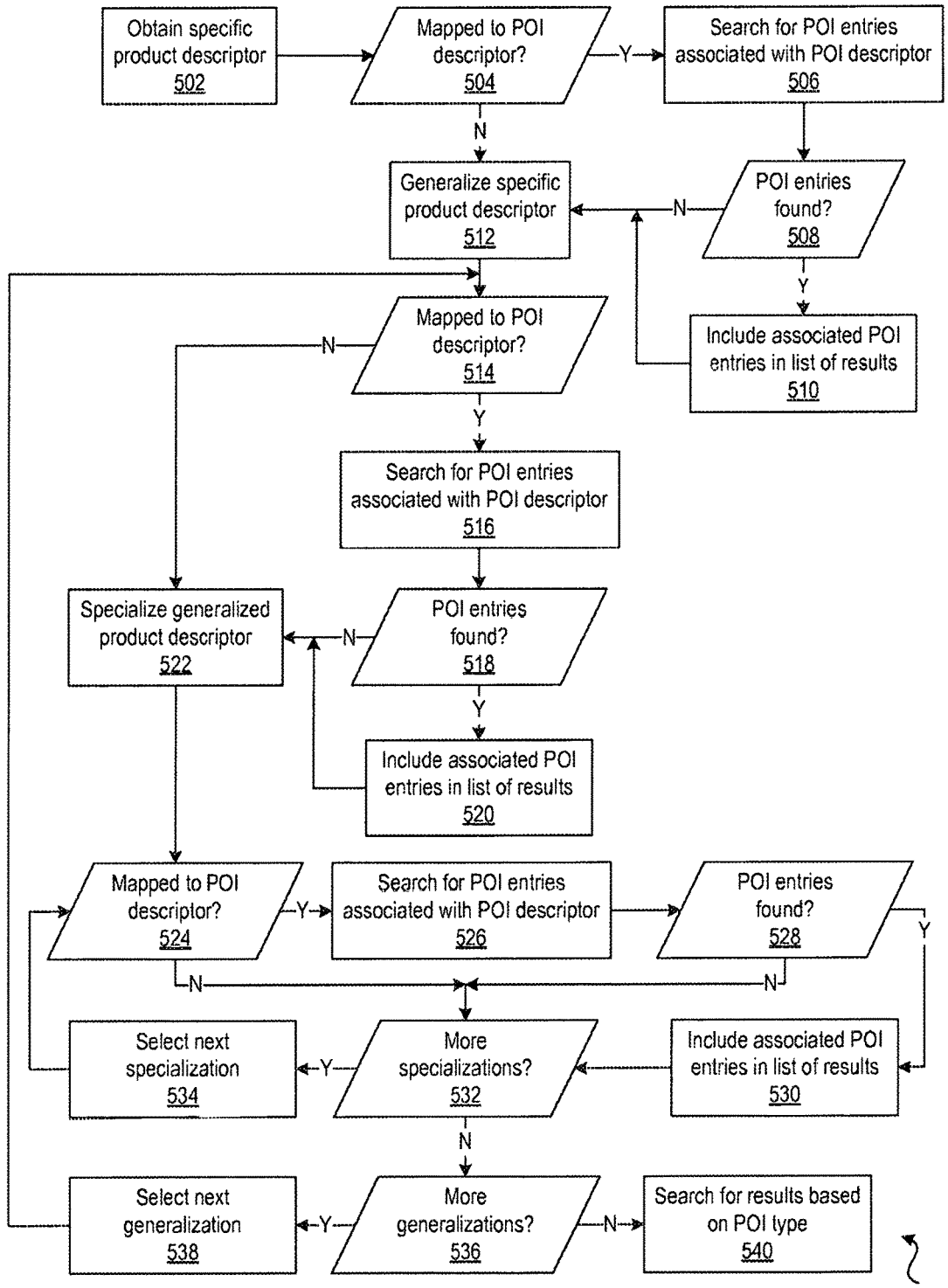
FIG. 5 is a flowchart of example method steps for identifying POIs relevant to a product specified by a user.

Referring now to FIG. 5, a flowchart 500 of example method steps for identifying POIs relevant to a product specified by a user is shown. The example steps set forth below identify relevant results based on the specific product descriptor. As shown below, the recommendation engine searches for POIs associated with the specific product descriptor, generalized product descriptors based on the specific product descriptor, and specialized product descriptors based on the specific product descriptor.

The recommendation engine may obtain a specific product descriptor for a specified product (block 502) and determine whether a taxonomy mapping maps the specific product descriptor to a POI descriptor (block 504) as described above. If the taxonomy mapping does map the specific product descriptor to a related POI descriptor (block 504:Y), then the recommendation engine may search a POI repository for POI entries associated with the related product descriptor (block 506). If the POI repository includes POI entries associated with the related POI descriptor (block 508:Y), then the recommendation engine may include the POIs associated with the related POI descriptor in the list of results to be provided to the user (block 510).

If the taxonomy mapping does not map the specific product descriptor to a POI descriptor (block 504:N) or if the POI repository does not include POI entries associated with a related POI descriptor (block 508:N), then the recommendation engine may generalize the specific product descriptor (block 512). The recommendation engine may generalize the specific product descriptor (block 512) even if POI entries are located and included in the list of results (block 510). In this way, the recommendation engine may advantageously provide possible alternative results that may satisfy the needs of the user.

Having obtained a generalized product descriptor based on the specific product descriptor (block 512), the recommendation engine may similarly determine whether the taxonomy mapping includes a mapping between the generalized product descriptor and a related POI descriptor (block 514). If the taxonomy mapping maps the generalized product descriptor to a related POI descriptor (block 514:Y), the recommendation engine may similarly search the POI repository for POI entries associated with the related POI descriptor that is mapped to the generalized product descriptor (block 516). If the POI repository includes POI entries associated with the related POI descriptor (block 518:Y), then the recommendation engine may similarly include those POI entries in the list of results presented to the user.

If the taxonomy mapping does not map the generalized product descriptor to a related POI descriptor (block 514:N) or if the POI repository does not include any POI entries associated with the related POI descriptor (block 518:N), then the recommendation engine may specialize the generalized product descriptor (block 522) as described above for any sub-levels that the recommendation engine has not yet considered. It will be appreciated that the recommendation engine may specialize the generalized product descriptor even if POI entries are located and included in the list of results (block 520). The recommendation may thus likewise provide possible alternative results that may satisfy the needs of the user.

If the taxonomy mapping maps the specialized product descriptor to a related POI descriptor (block 524:Y), then the recommendation engine may search the POI repository for POI entries associated with the POI descriptor (block 526). If the POI repository includes POI entries associated with the related POI descriptor (block 528: Y), then the recommendation engine may include those POI entries in the list of results presented to the user (block 530). If the taxonomy mapping does not map the specialized product descriptor to a related POI descriptor (block 524:N) or if the POI repository does not include any entries associated with the related POI descriptor (block 528:N), then the recommendation engine may determine if the product taxonomy includes any additional specialized product descriptors associated with the generalized product descriptor (block 532). If the generalized product descriptor is associated with more specialized product descriptors (block 532:Y), then the recommendation engine may select the next specialization of the generalized product descriptor to obtain another specialized product descriptor (block 534) and repeat steps 524-532 for any additional specializations of the generalized product descriptor. The recommendation engine may select additional specialized product descriptors (block 534) even if the POI repository includes POI entries associated with a POI descriptor related to one of the specialized product descriptors. It will be appreciated that POI entries associated with a POI descriptor mapped to a specialized product descriptor may represent POIs at which alternative but similar products may be available. Even though the results may include POIs that are associated with alternative products, users may nonetheless find such results useful to satisfy their needs.

If the recommendation engine determines that there are no additional specializations associated with the generalized product descriptor (block 532:N), then the recommendation may determine whether any additional generalizations are associated with the specific product descriptor (block 536). If there are more generalizations associated with the specific product descriptor (block 536:Y), then the recommendation engine may select the next generalization associated with the specific product descriptor (block 538) to obtain a new generalized product descriptor and repeat steps 514-536 for the new generalized product descriptor and any specialized product descriptors obtained based on the new generalized product descriptor. It will be appreciated that the results obtained for the generalized product descriptors and the specialized product descriptors might not perfectly match the specified product received from the user. The results, however, may be imperfect matches since the results are associated with alternative products that may nonetheless satisfy the needs of the user. If the recommendation engine determines that there are no additional generalizations associated with the specific product descriptor (block 536:N), then the recommendation engine may further search for relevant POIs associated with the specified product based on the POI type identified for the specified product as discussed above.

To continue the example set forth above in FIG. 2, consider that the user specified "beefsteak tomatoes" as the specified product. The recommendation engine may obtain the specific product descriptor 210f for the specified product of "beefsteak tomatoes." During a first iteration, the recommendation engine may determine that the taxonomy mapping 204 does not include a mapping between the specific product descriptor 210f and a POI descriptor. The recommendation engine may then generalize the specific product descriptor 210f to obtain the generalized product descriptor 210d and again determine the taxonomy mapping 204 does not include a mapping for the generalized product descriptor. The recommendation engine may then iteratively specialize the generalized product descriptor 210d to obtain specialized product descriptors 210g-i respectively and determine that the taxonomy mapping 204 also does not include a mapping to a POI descriptor for these specialized product descriptors either. The recommendation engine may continue to generalize the product descriptor to obtain generalized product descriptors 210b and 210a respectively. The recommendation engine may determine that the taxonomy mapping 204 does include a mapping 216a between the product descriptor 210b and the POI descriptor 214b. Having identified a mapping, the recommendation engine may search the POI repository 206 using the POI descriptor 214b for an POI entries associated with the POI descriptor, which, in this example, includes POI entries 222a-b.

The recommendation engine may generalize the product descriptors until the recommendation engine reaches the product descriptor 208a at the top level of the product taxonomy, e.g., "product.food". The recommendation engine may then descend into lower levels of the product taxonomy by iteratively specializing the top-level product descriptor 208a. In this example, the recommendation engine may iteratively specialize product descriptors to obtain product descriptors 210c, 210e, and 210j-l. During the iterations for these specialized product descriptors, the recommendation engine may determine that the taxonomy mapping 204 includes mappings 216b and 216c respectively establishing a relationship between the product descriptor 210c ("product.food.dairy") and the POI descriptor 214e ("poi.shop.grocery.deli") and a relationship between the product descriptor 210c and the POI descriptor 214d ("poi.shop.convenience"). The recommendation engine may then search the POI repository 206 for POI entries associated with the product descriptor 210c, which, in this example, includes the POI entries 222c-e associated with POI descriptor 214d and includes the POI entry 222f associated with the POI descriptor 214e. In this way, this list of results may advantageously include the convenience stores and the deli included in the POI repository, which represent alternative types of POIs that may carry products that satisfy the needs of the user. Additional examples will be appreciated with the benefit of this disclosure.

Figure 6:
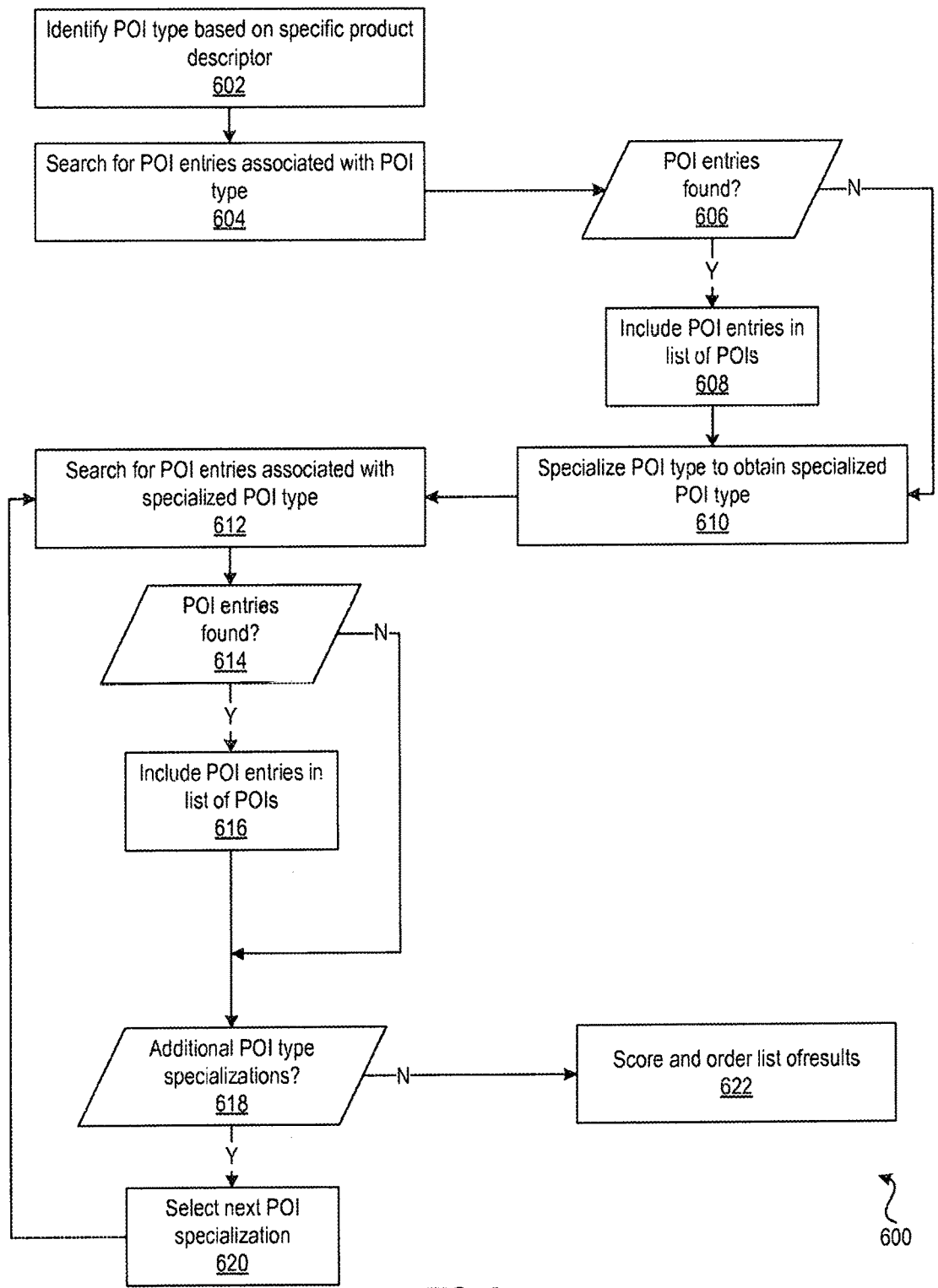
FIG. 6 is another flowchart of example method steps for identifying POIs relevant to a product specified by a user.

In FIG. 6, another flowchart 600 of example method steps for identifying POIs relevant to a product specified by a user is shown. The recommendation engine may implement one or more of the steps described below in order to identify POI entries in the POI repository that are associated with the POI type selected for the specified product.

As described above with reference to FIG. 4, the recommendation engine may select a POI type based on the specified product (block 602), e.g., a POI type associated with a generalized product descriptor that is based on the specific product descriptor for the specified product. The recommendation engine may then search the POI repository for POI entries associated with the POI descriptor for the selected POI type (block 604). If the POI repository includes POI entries associated with the POI descriptor (block 606: Y), then the recommendation engine may include those POI entries in the list of results (block 608). If the POI repository does not include POI entries associated with the POI descriptor (block 606:N), then the recommendation engine may specialize the POI descriptor to obtain a specialized POI descriptor (block 610) based on the POI descriptor. The recommendation engine may specialize the POI descriptor even if the POI repository includes POI entries associated with the POI descriptor. In this way, the recommendation engine may advantageously locate alternative types of POI entries that may satisfy the needs of the user.

Having obtained a specialized POI descriptor, the recommendation engine may search the POI repository for POI entries associated with the specialized POI type (block 612). If the POI repository includes POI entries associated with the specialized product descriptor (block 614:Y), then the recommendation engine may include those POI entries in the list of results provided to the user (block 616). If the POI repository does not include POI entries associated with the specialized product descriptor, then the recommendation engine may determine whether any additional POI specializations are associated with the POI type (block 618). If there are additional POI specializations associated with the POI type (block 618:Y), then the recommendation engine may select another specialized. POI descriptor for the next POI specialization (block 620) and repeat steps 612-618 for any additional POI specializations. The recommendation engine may select additional specialized POI descriptors even if the POI repository includes POI entries associated with a previous specialized POI descriptor. In this way, the recommendation engine may locate POI entries for alternative types of POIs that may satisfy the needs of the user. If there are no additional POI specializations to search for (block 618:N), the recommendation engine may provide the list of search results to the scoring module for scoring and ordering (block 622).

Again continuing the example discussed above with reference to FIG. 2, a user may specify "beefsteak tomatoes" as the specified product, the recommendation engine may obtain the specific product descriptor 210f for the specified product. The recommendation engine may generalize the product descriptor 210f to obtain the generalized product descriptor 210a ("product.food") and select the POI descriptor 214b ("product.shop.grocery") as the POI type associated with the specific product descriptor 210f based on the mapping 216a in the taxonomy mapping 204. The recommendation engine may then iteratively specialize the POI descriptor 214b to respectively obtain specialized POI descriptors 214e and 214f. The recommendation engine may then respectively search the POI repository 206 using the product descriptors 214e-f. The recommendation engine, in this example, may determine that the POI repository 206 includes a POI entry 222f associated with the POI descriptor 214e ("poi.shop.grocery.deli") and include this POI entry in the list of results provided to the user. Because the user may be able to find tomatoes at a deli, the POI entry may thus be a relevant result to the user. Additional examples will be appreciated with the benefit of this disclosure.

Figure 7:
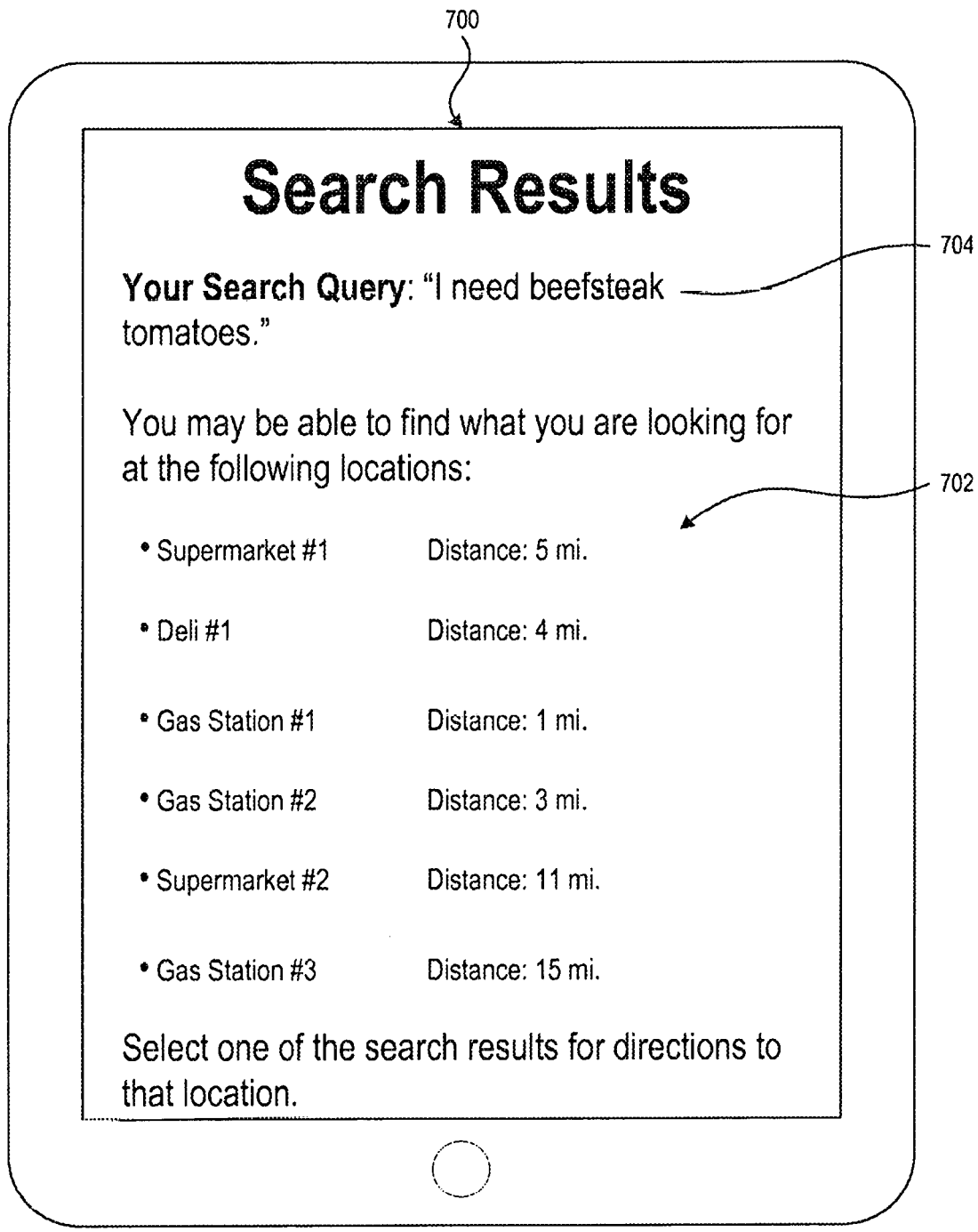
FIG. 7 is an example of an implementation of a user interface that displays a list of results obtained for a product specified by a user.

In FIG. 7, an example of an implementation of a user interface 700 that displays a list of results 702 obtained for a product 704 specified by a user is shown. The list of results 702, in this example, may be generated by the recommendation engine as described above with reference to FIGS. 2-6. As seen in FIG. 7, the list of results 702, in this example, includes Pals that may provide the specified product 704. The list of results 702, in this example, also includes the distance between the present geographic location of the user and the respective geographic locations of the POIs. The list of results 702, in this example, is also ordered according to the relevancy of the POI to the specified product 704, which is based, at least in part, on the distance between the user and the POI in this example. The user interface 700 may permit the user to select one of the POIs included in the list of results 702 and, in response to the selection, provide directions between the current geographic location of the user and the geographic location of the POI. Other examples will be appreciated with the benefit of this disclosure. In an alternative example, a user interface may display a list of sections of a user manual that are relevant to a search term provided to a user.

Figure 8:
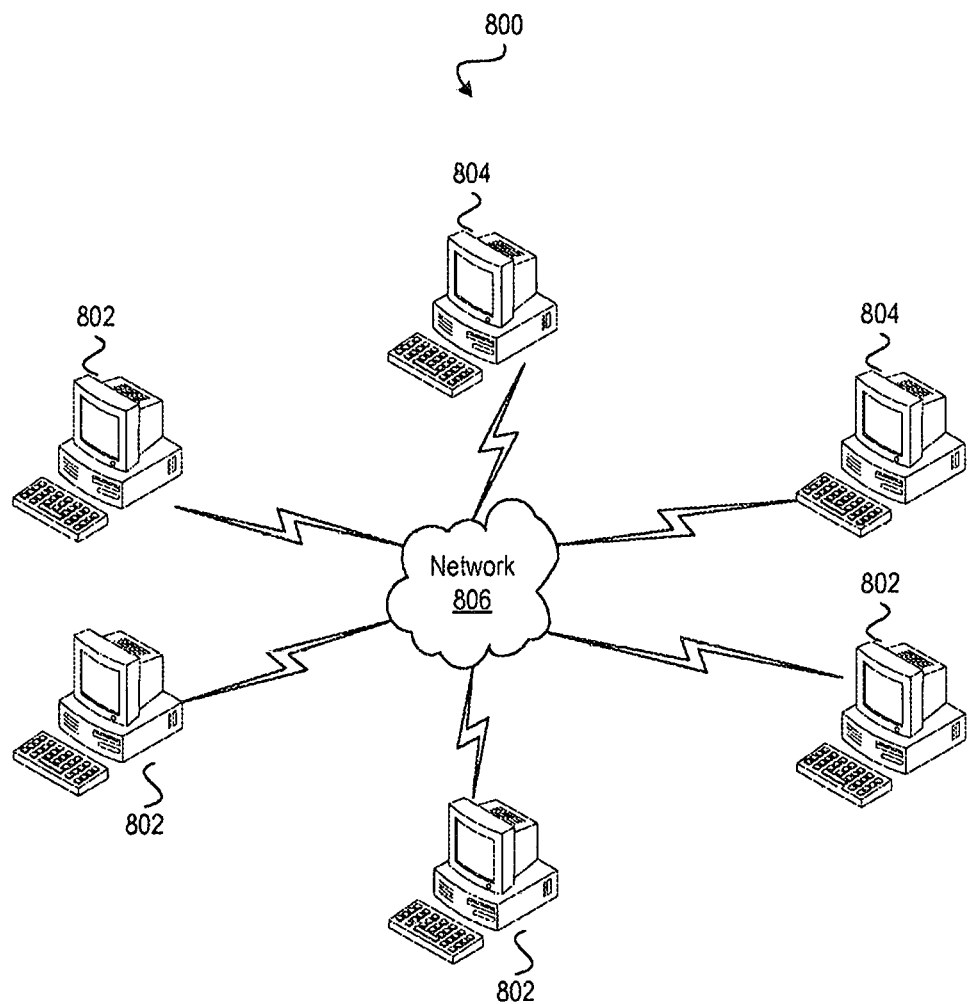
FIG. 8 is an example of an implementation of a computing environment in which aspects of the present disclosure may be implemented.

In FIG. 8, an example of an implementation of a computing environment 800 in which aspects of the present disclosure may be implemented is shown. Client computing devices 802 and server computing devices 804 provide processing, storage, and input/output devices executing application programs and the like. Client computing devices 802 may include, e.g., desktop computers, laptop computers, tablet computers, palmtop computers, smartphones, smart televisions, and the like. Client computing devices 802 can also be linked through communications network 806 to other computing devices, including other client devices computing devices 802 and server computing devices 804. Communications network 806 can be part of a remote access network, a global network (e.g., the Internet), a cellular network, a worldwide collection of computers, local area or wide area networks, and gateways that currently use respective protocols (TCP/IP, Bluetooth, etc.) to communicate with one another. Other electronic device/computer network architectures are suitable.

Figure 9:
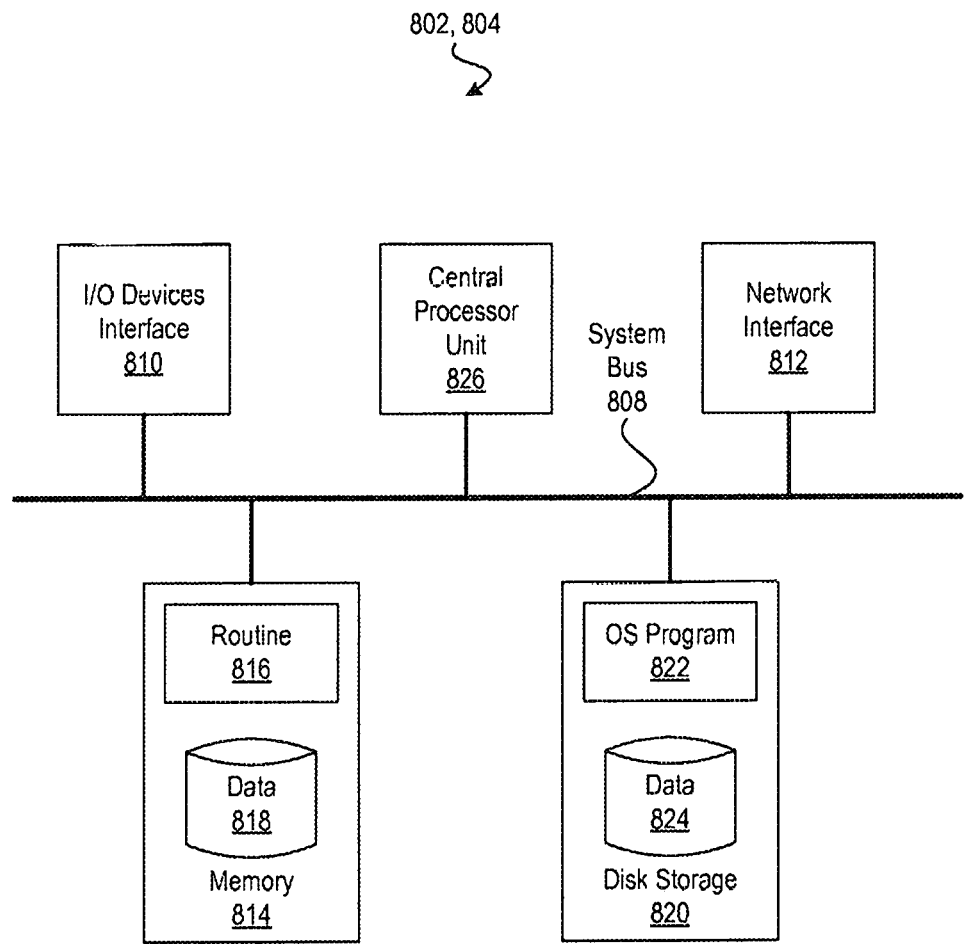
FIG. 9 is a block diagram of one of the computing devices of the computing environment of FIG. 8.

In FIG. 9, a block diagram of one of the computing devices 802 or 804 of the computing environment 800 of FIG. 8 is shown. The computing device 802 or 804 contains system bus 808, where a bus is a set of hardware lines used for data transfer among the components of a computing device or processing system. Bus 808 is essentially a shared conduit that connects different elements of a computing device (e.g., processor, disk storage, memory, input/output ports, network ports, etc.) that enables the transfer of information between the elements. Attached to system bus 808 is I/O device interface 810 for connecting various input and output devices (e.g., keyboard, mouse, displays, printers, speakers, etc.) to the computing device 802 or 804. Network interface 812 allows the computing device to connect to various other devices attached to a network (e.g., network 806 of FIG. 8). Memory 814 provides volatile storage for computer software instructions 816 and data 818 used to implement aspects described herein (e.g., a recommendation engine implementing the steps detailed above). Disk storage 820 provides non-volatile storage for computer software instructions 822 and data 824 used to implement various aspects of the present disclosure. Central processor unit 826 is also attached to system bus 808 and provides for the execution of computer instructions.

In one embodiment, the processor routines 816 and 822 as well as data 818 and 824 are a computer program product, including a computer-readable medium (e.g., a removable storage medium such as one or more DVD-ROM's, CD-ROM's, diskettes, tapes, etc.) that provides at least a portion of the software instructions for implementing aspects of the present disclosure. The computer program product can be installed by any suitable software installation procedure, as is well known in the art. At least a portion of the software instructions may also be downloaded over a cable, communication and/or wireless connection. Computer-readable media include all computer-readable media with the sole exception of a transitory propagating signal.

While aspects have been particularly shown and described with references to example embodiments thereof, it will be understood that various changes in form and details may be made therein without departing from the scope and spirit identified by the appended claims.

What is claimed is:

1. A computer-implemented method, comprising:
   receiving input from a user wherein the input comprises a specified subject;
   obtaining a specific descriptor for the specified subject from a hierarchical taxonomy associated with the specified subject;
   searching an information repository based on the specific descriptor and indicating in results one or more entries stored at the information repository that are associated with the specific descriptor;
   iteratively generalizing the specific descriptor to obtain at least one generalized descriptor, wherein generalizing the specific descriptor includes removing a level from the specific descriptor for the hierarchical taxonomy associated with the specific descriptor;
   searching the information repository based on one or more of the generalized descriptors and indicating in the results one or more entries stored at the information repository that are associated with one of the generalized descriptors;
   iteratively specializing one or more of the generalized descriptors to obtain at least one specialized descriptor, wherein specializing the one or more of the generalized descriptors includes adding a level from one of the one or more generalized descriptors for the hierarchical taxonomy associated with the specific descriptor; and
   searching the information repository based on one or more of the specialized descriptors and indicating in the results one or more entries stored at the information repository that are associated with one of the specialized descriptors.

2. The computer-implemented method of claim 1 wherein the hierarchical taxonomy is a first hierarchical taxonomy and further comprising:
   searching a taxonomy mapping that maps at least one descriptor associated with the first hierarchical taxonomy to at least one related descriptor of a second hierarchical taxonomy;
   identifying a mapping between the specific descriptor and one of the related descriptors of the taxonomy mapping; and
   wherein searching the information repository based on the specific descriptor comprises searching the information repository using the related descriptor.

3. The computer-implemented method of claim 2 wherein:
   searching the information repository based on one or more of the generalized descriptors comprises searching the information repository using one of the related descriptors that is mapped to one of the generalized descriptors; and
   searching the information repository based on one or more of the specialized descriptors comprises searching the information repository using one of the related descriptors that is mapped to one of the specialized descriptors.

4. The computer-implemented method of claim 2 further comprising:
   iteratively specializing one of the related descriptors to obtain at least one specialized related descriptor; and
   searching the information repository using one of the specialized related descriptors and indicating in the results one or more entries stored at the information repository that are associated with the specialized related descriptor.

5. The computer-implemented method of claim 2 further comprising:
   scoring individual results in the results to obtain respective result scores for the individual results; and
   ordering the results based on the respective result scores.

6. The computer-implemented method of claim 5 wherein one of the result scores for one of the results in the results is based, at least in part, on a number of generalizations or a number of specializations performed in order to locate the result in the information repository.

7. The computer-implemented method of claim 6 wherein:
   the result is a place-of-interest having a geographic location; and
   the result score for the place-of-interest is further based on a distance between the geographic location of the place-of-interest and a current location of the user.

8. The computer-implemented method of claim 2 wherein:
   the specified subject is a specified product the user desires to purchase;
   the first taxonomy is a product taxonomy of products and the specific descriptor is a specific product descriptor;
   the second taxonomy is a place-of-interest taxonomy of places-of-interest and the related descriptor is a place-of-interest descriptor corresponding to a place-of-interest that provides the specified product; and
   the results include one or more places-of-interest.

9. The computer-implemented method of claim 8 further comprising including geographic information in the results wherein the geographic information indicates respective geographic locations of one or more of the places-of-interest in the results.

10. The computer-implemented method of claim 1 wherein:
    the specific descriptor comprises a plurality of classifications that describe the specified subject and that are nested relative to one another;

generalizing the specific descriptor comprises removing the most specific classification from the specific descriptor; and specializing one of the generalized descriptors comprises adding a new classification to the generalized descriptor that is more specific relative to each classification of the generalized descriptor.

11. A system for providing possible solutions to a problem posed by a user comprising:

at least one processing unit;

memory storing computer-readable instructions that, when executed by the processing unit, cause the system to provide:

an interface configured to receive input from a user, where the input comprises a specified subject; and a recommendation engine configured to obtain a specific descriptor for the specified subject from a hierarchical taxonomy associated with the specified subject, iteratively generalize the specific descriptor to obtain at least one generalized descriptor, wherein generalizing the specific descriptor includes removing a level from the specific descriptor for the hierarchical taxonomy associated with the specific descriptor, iteratively specialize one or more of the generalized descriptors to obtain at least one specialized descriptor, wherein specializing the one or more of the generalized descriptors includes adding a level from one of the one or more generalized descriptors for the hierarchical taxonomy associated with the specific descriptor, and search an information repository based on the specific descriptor, the one or more generalized descriptors, and the one or more specialized descriptors to obtain results;

wherein the results comprises indications of entries stored at the information repository that are respectively associated with at least one of the specific descriptor, the one or more generalized descriptors, and the one or more specialized descriptors.

12. The system of claim 11 wherein:

the hierarchical taxonomy is a source hierarchical taxonomy; and the recommendation engine is further configured to search a taxonomy mapping that maps at least one descriptor associated with the first hierarchical taxonomy to at least one related descriptor of a target hierarchical taxonomy;

identify a mapping between the specific descriptor and one of the related descriptors of the taxonomy mapping; and search the information repository using the related descriptor.

13. The system of claim 12 wherein the recommendation engine is further configured to search the information repository using one of the related descriptors that is mapped to one of the generalized descriptors and search the information repository using one of the related descriptors that is mapped to one of the specialized descriptors.

14. The system of claim 12 wherein:

the recommendation engine is further configured to iteratively specialize one of the related descriptors to obtain at least one specialized related descriptor and search the information repository using one of the specialized related descriptors; and the results further comprises indications of one or more entries stored at the information repository that are associated with the specialized related descriptor.

15. The system of claim 12 wherein:

the computer-readable instructions, when executed by the at least one processing unit, further cause the system to provide a scoring module; and the scoring module is configured to score individual results in the results to obtain respective result scores for the individual results and order the results based on the respective result scores.

16. The system of claim 15 wherein one of the result scores for one of the results in the results is based, at least in part, on a number of generalizations or a number of specializations performed in order to locate the result in the information repository.

17. The system of claim 16 wherein:

the result is a place-of-interest having a geographic location; and the result score for the place-of-interest is further based on a distance between the geographic location of the place-of-interest and a current location of the user.

18. The system of claim 12 wherein:

the specified subject is a specified product the user desires to purchase;

the source taxonomy is a product taxonomy of products and the specific descriptor is a specific product descriptor;

the target taxonomy is a place-of-interest taxonomy of places-of-interest and the related descriptor is a place-of-interest descriptor corresponding to a place-of-interest that provides the specified product; and the results include one or more places-of-interest.

19. The system of claim 18 wherein the recommendation engine is further configured to include geographic information in the results wherein the geographic information indicates respective geographic locations of one or more of the places-of-interest in the results.

20. The system of claim 11 wherein:

the specific descriptor comprises a plurality of classifications that describe the specified subject and that are nested relative to one another;

the recommendation engine is configured to generalize the specific descriptor by removing the most specific classification from the specific descriptor; and the recommendation engine is configured to specialize one of the generalized descriptors by adding a new classification to the generalized descriptor that is more specific relative to each classification of the generalized descriptor.

* * * * *